Figure 1:
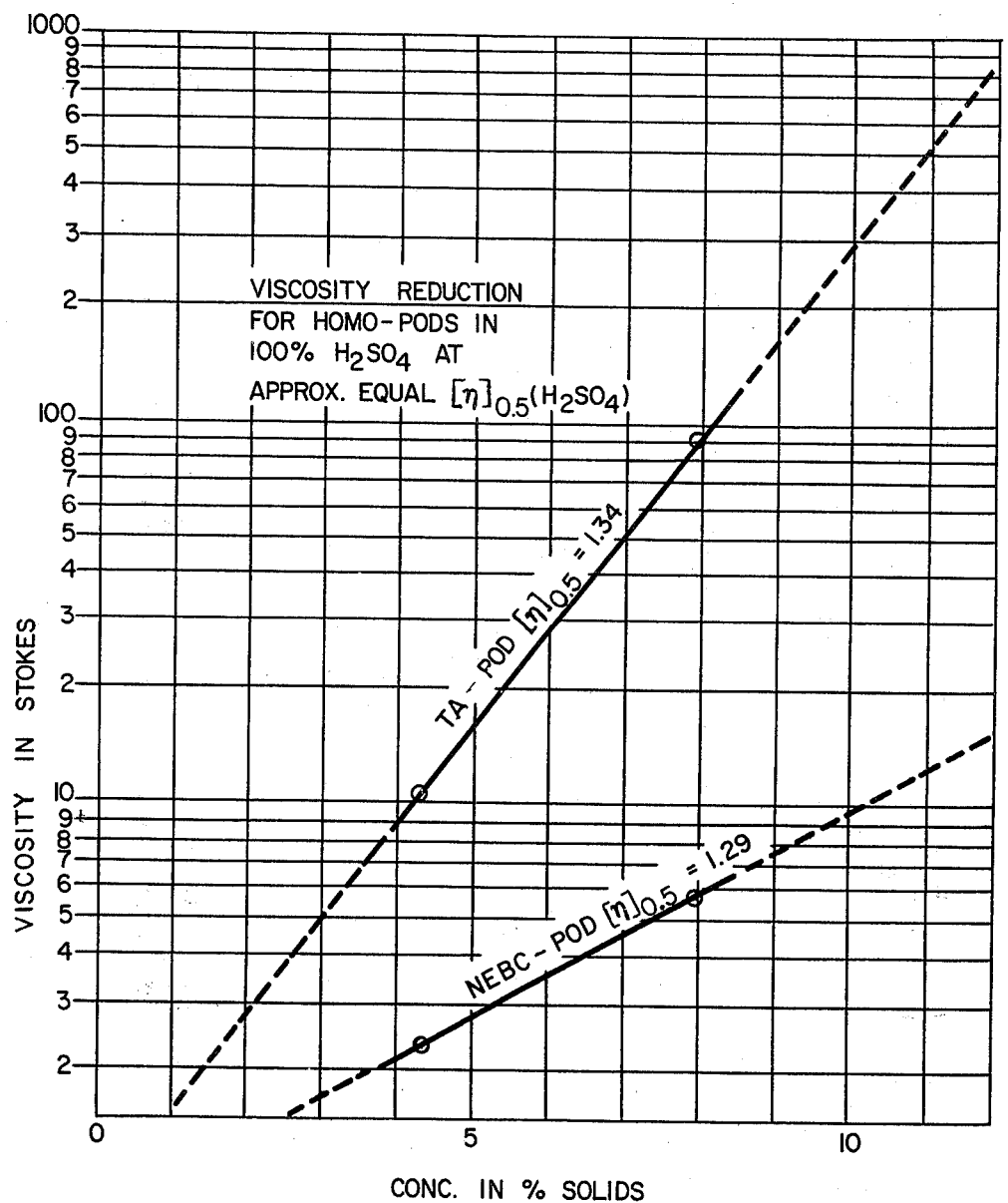

United States Patent [19]

Stephens

[11] 4,429,108
[45] Jan. 31, 1984

[54] POLY[N,N'-(ALKYL OR ARYL)-BIS(4,4'-PHTHALIMIDO)-1,3,4-OXADIAZOLE-2,5-DIYLS]

[75] Inventor: James R. Stephens, Naperville, Ill.

[73] Assignee: Standard Oil Company (Indiana), Chicago, Ill.

[21] Appl. No.: 424,606

[22] Filed: Sep. 27, 1982

[51] Int. Cl.³ .................. C08G 73/08; C08G 73/10
[52] U.S. Cl. .................. 528/322; 528/183; 528/321; 528/350; 528/352; 528/179; 528/313
[58] Field of Search ............. 528/322, 321, 350, 352

[56] References Cited

U.S. PATENT DOCUMENTS

| | | | |
|---|---|---|---|
| 3,518,230 | 6/1970 | Sheffer et al. | 528/322 |
| 3,542,731 | 11/1970 | Culbertson | 528/322 |
| 3,975,345 | 8/1976 | Fessler | 528/322 |
| 4,066,631 | 1/1977 | Dimmig | 528/322 |

FOREIGN PATENT DOCUMENTS

| | | |
|---|---|---|
| 882789 | 10/1971 | Canada . |
| 48-7880 | 9/1973 | Japan . |
| 1455776 | 11/1976 | United Kingdom . |

OTHER PUBLICATIONS

Journal of Polymer Science: Part A, vol. 3, pp. 45-54 (1965)-Iwakura et al.
Polymer Letters, vol. 4, pp. 267-272 (1966) Preston et al.
High Temperature Resistant Polymers-Frazer (1968), pp. 178-188.
Journal of Applied Polymer Science, vol. 25 (1980), pp. 315-321, Jones et al.
Journal of Applied Polymer Science, vol. 26 (1981), pp. 571-577-Varma et al.
Journal of Polymer Science: Part A-1, vol. 6 (1968), p. 215-233, Frost et al.

Primary Examiner—Harold D. Anderson
Attorney, Agent, or Firm—Gunar J. Blumberg; William T. McClain; William H. Magidson

[57] ABSTRACT

Novel Poly[N,N'-(alkyl or aryl)-bis(4,4'-phthalimido)-1,3,4-oxadiazole-2,5-diyls], compositions for fibers, films, coatings and molded objects featuring high strength and high thermal properties with formulation advantages.

35 Claims, 1 Drawing Figure

POLY[N,N'-(ALKYL OR ARYL)-BIS(4,4'-PHTHALIMIDO)-1,3,4-OXADIAZOLE-2,5-DIYLS]

BACKGROUND OF THE INVENTION

1. Field of the Invention

The field of the invention relates to novel fiber forming Poly[N,N'-(alkyl or aryl)-bis(4,4'-phthalimido)-1,3,4-oxadiazole-2,5-diyls] hereinafter referred to as PBOs.

In the prior art, the article by Y. Iwakura, et al., in The Journal of Polymer Science (A)3, page 45 (1965), discloses a method for the synthesis of polyoxadiazoles from hydrazine sulfate and simple diacids such as terephthalic acid. Other prior art references include the article by R. S. Jones, et al., in Journal of Applied Polymer Science, Vol. 25, pages 315–321 (1980), British Patent Specification No. 1,455,776; Canadian Patent No. 882,789; and the article by S. K. Varma; et al., Journal of Applied Polymer Science, Vol. 26, pages 571–577 (1981). The following Japanese patents further illustrate the prior art: J79,029,509–B42; J79,034,732–B47; J80,027,918–C34; and J50,037,778–W28. None of the foregoing references contemplate my novel fiber forming polyoxadiazoles.

The general objective of this invention is to provide novel fiber forming Poly[N,N'-(alkyl or aryl)-bis (4,4'-phthalimido)-1,3,4-oxadiazole-2,5-diyls] and a process for the manufacture of the PBOs from bis-imides in the presence of hydrazine sulfate using fuming sulfuric acid or polyphosphoric acid as the reaction medium. A further object is to provide fibers from PBOs having superior modulus to prior art polyoxadiazoles and also which exhibits no significant thermal decomposition at temperatures below about 300° C.

I have found that novel PBOs can be formed by reacting bis-imides with hydrazine sulfate utilizing fuming sulfuric acid or polyphosphoric acid as the reaction medium. The reaction is conducted at a temperature of about 25° to about 250° C. A preferred temperature is 150° C. for a time of 30 minutes. Generally temperatures of 100° to 150° C. are used at times ranging from about 15 minutes to about 4 hours. The PBOs have an inherent viscosity measured in sulfuric acid at 0.5 g/dl. Conc. at 25° C. of about 0.6 to about 6.0. For fiber application, the inherent viscosity is preferred to exceed about 1.0. These PBOs have superior modulus to prior art polyoxadiazoles and also exhibit no significant thermal decomposition at temperatures below about 300° C. For aliphatic groups having a carbon chain of 12 or more carbon atoms, polyphosphoric acid is the preferred reaction medium since PBOs incorporating these groups are insoluble in sulfuric acid.

It is also an objective of this invention to obtain polyoxadiazoles (PODs) that exhibit superior percent solids content at application viscosities. FIG. 1 shows the percent solids-viscosity of PODs obtained from either terephthalic acid (TA) or N,N'-(1,2-ethylenebis(4-carboxyphthalimide) (NEBC). NEBC is the PBO derived from ethylenediamine; this PBO for example gives at least twice the percent solids of the prior art POD derived from TA. This unique property gives our PBOs the advantage of preparing more massive fibers or films from a given volume of the polymer formulated in sulfuric acid.

In my process, trimellitic anhydride is reacted in a mole ratio of about 2:1 with an aliphatic or aromatic diamine to form a bis-imide. The PBOs are prepared by reacting about equal molar amounts of the bis-imide with hydrazine sulfate at a temperature of about 25° C. to about 250° C. in fuming sulfuric acid or polyphosphoric acid. The novel PBO's have the following structure:

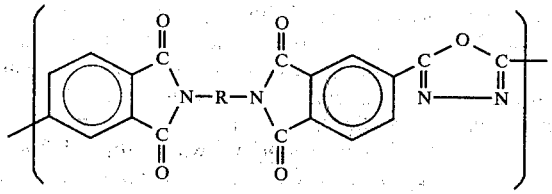

wherein R is a divalent aliphatic or aromatic radical. Suitably, when R is an aliphatic hydrocarbon, the carbon chain comprises 1 to about 12 carbon atoms. When R is an aromatic hydrocarbon radical the carbon atoms are in the range of about 6 to about 20. The preferred values for R are $(CH_2)_2$ and $(CH_2)_6$.

The carbon chain length and structure and the type of aromatic moieties utilized are determined by analyzing their ability to withstand attack or sulfonation of the carbon moiety. Fibers can be manufactured from PBOs in the following manner. The reaction solution, after completion of the polycondensation of the hydrazine sulfate with the appropriate bis-imide is cooled and mixed with sulphuric acid, 100 percent or concentrated until a solution with no water present has the required viscosity. (If the reaction solution has a low viscosity it may be used directly without dilution). The mixture is homogenized with stirring, and the resulting solution is filtered through an acid-proof fabric and deaerated under vacuum. The resulting spinning solution is formed into fibers using about 0 to 50 percent aqueous solution of sulfuric acid as a spinning bath. Non-washed, freshly formed fibers are oriented by stretching, for example, in air, or in a bath 0 to 50 percent aqueous sulfuric acid. A useful fiber spinning method is disclosed by R. S. Jones, et al., Journal of Applied Polymer Science, Vol. 25, 315–321 (1980).

The following examples illustrate the preferred embodiment of the invention. It will be understood that the examples are for illustrative purposes only and do not purport to be wholly definitive with respect to conditions or scope of the invention.

EXAMPLE 1

A dispersion of 768.5 g (4 moles) of trimellitic anhydride, 800 ml. of N-methylpyrrolidone (NMP), and 250 g of xylene was stirred at room temperature in a 5 liter flask fitted with a thermometer, reflux condenser and Dean-Stark Trap. A solution of 120.2 g (2 moles) of ethylenediamine dissolved in 200 g of NMP was then added to it over a 5 minute period. The initial exothermic reaction raised the temperature to 120° C. External heating was then started, allowing the temperature to rise gradually to 182° C. over a two-hour period. During this time a 104 ml water-NMP phase azeotropic product was removed from the Dean-Stark Trap. After cooling overnight the reaction mixture was again refluxed an hour yielding only an additional 0.5 ml of water phase azeotrope. The mixture was then cooled and 700 ml of methanol was added. The precipitated reaction product was then filtered at room temperature, washed on the filter with 2500 ml of methanol in 3 portions, then dried in a hot air stream to constant weight. The yield was 695.3 g (85 percent) of N,N'-1,2-ethylenebis(4-carboxyphthalimide).

EXAMPLE 2

A solids mixture of 3.19 g (0.0245 mole) of hydrazine sulfate and 10.00 g (0.0245 mole) of N,N'-1,2-ethylenebis(4-carboxyphthalimide) was placed in a small flask under a nitrogen blanket. Thirty-nine and two-tenths gram of 30 percent fuming sulfuric acid was added to it, and stirring started with the flask being immersed in a pre-heated oil bath controlled at 150° C. Heating and stirring at 150° C. was continued for 4 hours. During this time solution of reactants and a viscosity rise took place. On cooling the clear viscous solution became a rubbery opaque mass. The contents of the flask were then agitated with 600 ml of cold water for 3 minutes in a home blender. The solid product was then washed slowly on the filter until the PH of the effluent wash was 5. It was dried in a stream of air, then in a vacuum oven at 120° C. until its weight was constant. The yield was 6.93 g. Its inherent viscosity of 0.5 grams per deciliter in 100 percent $H_2SO_4$ was 1.70.
% N theoretical = 14.50
% N found (Normal Dumas N) = 12.82
% N found (High Temp. Dumas N) = 14.31.
Notes on the above preparation. It was found later that the above reaction was essentially complete in 30 minutes at 150° C., and subsequent preparations were made using this schedule.

EXAMPLE 3

N,N'-1,6-Hexamethylenebis(4-carboxyphthalimide) (NHC) was prepared using the procedure of Example 1. The product was obtained in 92 percent yield. Analysis by back-titration in excess 1/10 N NaOH equivalent weight = 115.9, theoretical equivalent weight = 116.1 (4 equivalents).

EXAMPLE 4

A polyoxadiazole was prepared from (NHC) using the procedure of Example 2 with the following reactants:
NHC = 11.38 g (0.0245 mole)
Hydrazine sulfate = 4.78 g (0.0367 mole)
30% fuming sulfuric acid = 39.2 g.
Polymerization, however, was carried out for only 30 minutes at 150° C. The workup was the same resulting in a polyoxadiazole of $[\eta]_{0.5}$ (100 percent $H_2SO_4$) = 1.45.
% N (Normal Dumas N) found = 11.82 Theory = 12.66.
These compositions have high thermal stability—hence, do not burn well in normal elemental testing.

EXAMPLE 5

N,N'-4,4'-diphenylsulfonylbis(4-carboxyphthalimide) (NDC) was prepared from p-aminophenyl sulfone and trimellitic anhydride using the procedure of Example 1). Its acid titer by back-titration in excess of 1/10 N NaOH was 6.65 meg/g (theoretical = 6.71 meg/g).

EXAMPLE 6

A polyoxadiazole was prepared from NDC using the procedure of Example 2 with the following reactants:
NDC = 14.61 g (0.0245 mole)
hydrazine sulfate = 4.78 g (0.0367 mole)
30% fuming sulfuric acid = 39.2 g.
Polymerization, however, was carried out for 100 minutes at 100° C. The workup was the same resulting in a polyoxadiazole of $[\eta]_{0.5}$ (100 percent $H_2SO_4$) = 0.63.

EXAMPLE 7

For comparison purposes a polyoxadiazole was prepared essentially as in Example 2 with the following reactants:
terephthalic acid 40.70 g (0.245 mole)
hydrazine sulfate 39.82 g (0.3060 mole)
30% fuming sulfuric acid 400 g.
Reaction was carried as in Example 2 but only for 30 minutes at 150° C. The workup was done as in Example 2 but in about 10 small portions in the home blender until the total reaction water precipitate was obtained; $[\eta]_{0.5}$ in 100 percent $H_2SO_4$ = 1.21.

EXAMPLE 8

| Polymer | Tg | Temp. of Catastrophic Weight Loss in Thermogravimetric Analysis | | Residue at 850° C. |
| --- | --- | --- | --- | --- |
| | | in $N_2$ | in $O_2$ | in $N_2$ |
| From Example 2 | N.D. | 510° C. | 485° C. | 35% |
| From Example 4 | 172° C. | 468 | 390 and 530 | 25 |
| From Example 7 | N.D. | 531 | 527 | 42 |
| TORLON 4103 | 280° C. | 500 | 550 | 52 |

N.D. = None Dectected (up to 350° C.)

EXAMPLE 9

Dry Jet—Wet Spinning of Polyoxadiazoles

The polyoxadiazole from Example 7 and the PBO from Example 2 were dissolved in 100 percent sulfuric acid at levels of 7.3 and 14.6 percent solids respectively and hand-spun into a water bath using essentially the method of R. S. Jones and J. W. Soehngen, Journal of Applied Polymer Science, Vol. 25, 315–321 (1980). The raw fibers were oriented partly by hand, washed exhaustively with water, and finally dried at room temperature for 2 weeks before the test. Fiber test results were compared with a terephthalic acid based POD at equivalent tenacity.

| Fiber Test Results | | | |
| --- | --- | --- | --- |
| Polymer | $\eta 0.5(H_2SO_4)$ | Tangent Modulus (g/d) | Breaking Strength (g) |
| POD from terephthalic acid and hydrazine[1] | 1.5 to 2.2[2] | 26 | N.T.[3] |
| POD from terephthalic acid and hydrazine Example 7 | 2.6 | 22 | 164 |
| PBO from Example 2 | 1.7 | 70 | 429 |

| Polymer | Tenacity (g/d) | Elongation (%) |
| --- | --- | --- |
| POD from terephthalic acid and hydrazine[1] | 1.10 | 297 |
| POD from terephthalic acid and | 0.54 | 61 |

-continued

Fiber Test Results

| | | |
|---|---|---|
| hydrazine Example 7 | | |
| PBO from Example 2 | 1.10 | 13 |

[1] Polymer prepared, formulated, spun and tested by Jones and Soehngen.
[2] Indeterminate from work of Jones and Soehngen.
[3] Not tested.

Test results show at least one PBO as a fiber has a superior modulus to the "classical POD." It is also formulatable at higher percent solids at dope spinning viscosities. Thermal characteristics show a PBO to be about equivalent to a known commercial high temperature rated polymer (TORLON 4103) in material endurance but in regards to Tg there was none detected below 350° C. in the case of Example 2, i.e., it does not undergo any deformation at temperatures below about 350° C.

These characteristics of PBOs should make them especially useful as fibers with properties like "Kevlar" (poly(1,4-phenyleneterephthalamide)) at lower processing costs.

I claim:

1. A fiber forming polyimido oxadiazole comprising the recurring structure:

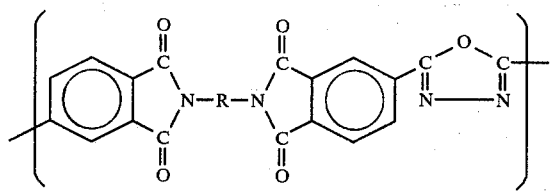

wherein R is a divalent aliphatic hydrocarbon radical.

2. The polyimido oxadiazole of claim 1 wherein R is an aliphatic hydrocarbon from 1 to 12 carbon atoms.
3. The polyimido oxadiazole of claim 1 wherein R is $(CH_2)_1$.
4. The polyimido oxadiazole of claim 1 wherein R is $(CH_2)_2$.
5. The polyimido oxadiazole of claim 1 wherein R is $(CH_2)_6$.
6. The polyimido oxadiazole of claim 1 wherein R is $(CH_2)_{12}$.
7. The polyimido oxadiazole of claim 1 wherein the polyimido oxadiazole is in the form of a fiber.
8. The polyimido oxadiazole of claim 2 wherein the polyimido oxadiazole is in the form of a fiber.
9. The polyimido oxadiazole of claim 3 wherein the polyimido oxadiazole is in the form of a fiber.
10. The polyimido oxadiazole of claim 4 wherein the polyimido oxadiazole is in the form of a fiber.
11. The polyimido oxadiazole of claim 5 wherein the polyimido oxadiazole is in the form of a fiber.
12. The polyimido oxadiazole of claim 6 wherein the polyimido oxadiazole is in the form of a fiber.
13. The polyimido oxadiazole of claim 1 wherein the polyimido oxadiazole is in the form of a film.
14. The polyimido oxadiazole of claim 2 wherein the polyimido oxadiazole is in the form of a film.
15. The polyimido oxadiazole of claim 3 wherein the polyimido oxadiazole is in the form of a film.
16. The polyimido oxadiazole of claim 4 wherein the polyimido oxadiazole is in the form of a film.
17. The polyimido oxadiazole of claim 5 wherein the polyimido oxadiazole is in the form of a film.
18. The polyimido oxadiazole of claim 6 wherein the polyimido oxadiazole is in the form of a film.
19. The polyimido oxadiazole of claim 1 wherein the polyimido oxadiazole is in the form of a coating.
20. The polyimido oxadiazole of claim 2 wherein the polyimido oxadiazole is in the form of a coating.
21. The polyimido oxadiazole of claim 3 wherein the polyimido oxadiazole is in the form of a coating.
22. The polyimido oxadiazole of claim 4 wherein the polyimido oxadiazole is in the form of a coating.
23. The polyimido oxadiazole of claim 5 wherein the polyimido oxadiazole is in the form of a coating.
24. The polyimido oxadiazole of claim 6 wherein the polyimido oxadizole is in the form of a coating.
25. The polyimido oxadiazole of claim 1 wherein the polyimido oxadiazole is in the form of a molded object.
26. The polyimido oxadiazole of claim 2 wherein the polyimido oxadiazole is in the form of a molded object.
27. The polyimido oxadiazole of claim 3 wherein the polyimido oxadiazole is in the form of a molded object.
28. The polyimido oxadiazole of claim 4 wherein the polyimido oxadiazole is in the form of a molded object.
29. The polyimido oxadiazole of claim 5 wherein the polyimido oxadiazole is in the form of a molded object.
30. The polyimido oxadiazole of claim 6 wherein the polyimido oxadiazole is in the form of a molded object.
31. A fiber forming polyimido oxadiazole comprising the recurring structure:

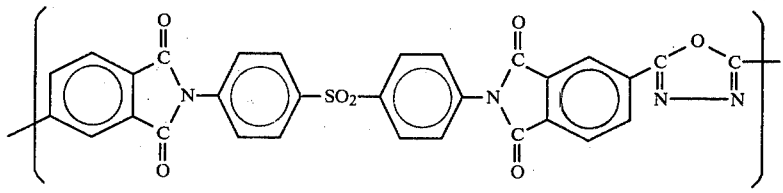

32. The polyimido oxadiazole of claim 31 wherein the polyimido oxadiazole is in the form of a fiber.
33. The polyimido oxadiazole of claim 31 wherein the polyimido oxadiazole is in the form of a film.
34. The polyimido oxadiazole of claim 31 wherein the polyimido oxadiazole is in the form of a coating.
35. The polyimido oxadiazole of claim 31 wherein the polyimido oxadiazole is in the form of a molded object.

* * * * *

UNITED STATES PATENT OFFICE
CERTIFICATE OF CORRECTION

Patent No. 4,429,108                                Dated   January 31, 1984

Inventor(s)   James R. Stephens

It is certified that error appears in the above-identified patent and that said Letters Patent are hereby corrected as shown below:

Patent reads:

Col. Line 4   19   "    " should read --Thermal Characteristics of PBOs and Comparison Polymers--

4   29   "Dectected" should read --Detected--

Signed and Sealed this

Thirtieth Day of April 1985

[SEAL]

Attest:

DONALD J. QUIGG

*Attesting Officer*     *Acting Commissioner of Patents and Trademarks*